United States Patent [19]

Miller

[11] 4,203,539
[45] May 20, 1980

[54] METHOD AND APPARATUS FOR CUTTING OPTICAL FIBERS

[75] Inventor: Glen E. Miller, Redondo, Wash.

[73] Assignee: The Boeing Company, Seattle, Wash.

[21] Appl. No.: 953,996

[22] Filed: Oct. 23, 1978

[51] Int. Cl.² ............................................. B26F 3/00
[52] U.S. Cl. ...................................... 225/2; 225/96.5
[58] Field of Search ..................... 225/2, 96.8; 83/879, 83/880

[56] References Cited

U.S. PATENT DOCUMENTS

| | | | |
|---|---|---|---|
| 3,138,308 | 6/1964 | Oakley | 225/96.5 X |
| 3,268,137 | 8/1966 | Martin | 225/96.5 X |
| 3,659,764 | 5/1972 | Janiszewski | 225/96.5 X |
| 3,866,449 | 2/1975 | Wakabayashi et al. | 225/96.5 X |
| 3,934,773 | 1/1976 | Chinnock et al. | 225/96.5 X |

Primary Examiner—Frank T. Yost
Attorney, Agent, or Firm—Nicolaas DeVogel

[57] ABSTRACT

A method and apparatus for cutting an optical fiber along a plane that is either oblique or perpendicular to its axis. In principle, a predetermined portion of a fiber is held between a fixed holding fixture and a driven retaining fixture. The driven fixture is adapted to travel in an orbiting, spiraling path. A cutting device is mounted adjacent to the fiber portion and between the fixed and driven fixtures. Upon activation, the driven fixture orbits in a spiraling path and successively, the fiber will contact the cutting edge of the cutting device when the radius of the traveled orbit is equal to the radius of the cutting edge. This contact with the cutting edge causes the fiber to be scribed circumferentially in a plane either oblique or perpendicular to its axis depending on the mounting angle of the cutting device. Further spiraling of the driven fixture bends the fiber at the scribe and causes the fiber to snap or break in the plane of the scribe mark.

5 Claims, 12 Drawing Figures

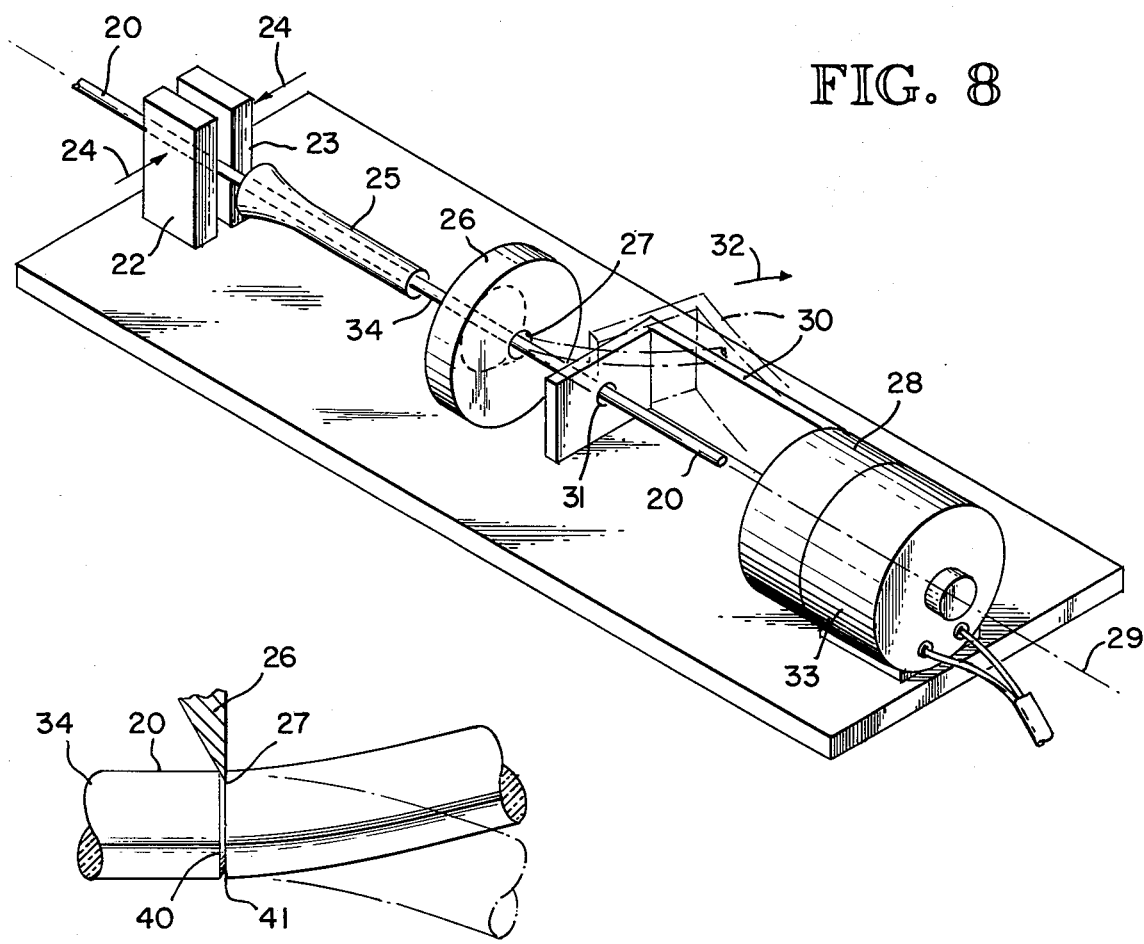
FIG. 8
FIG. 9
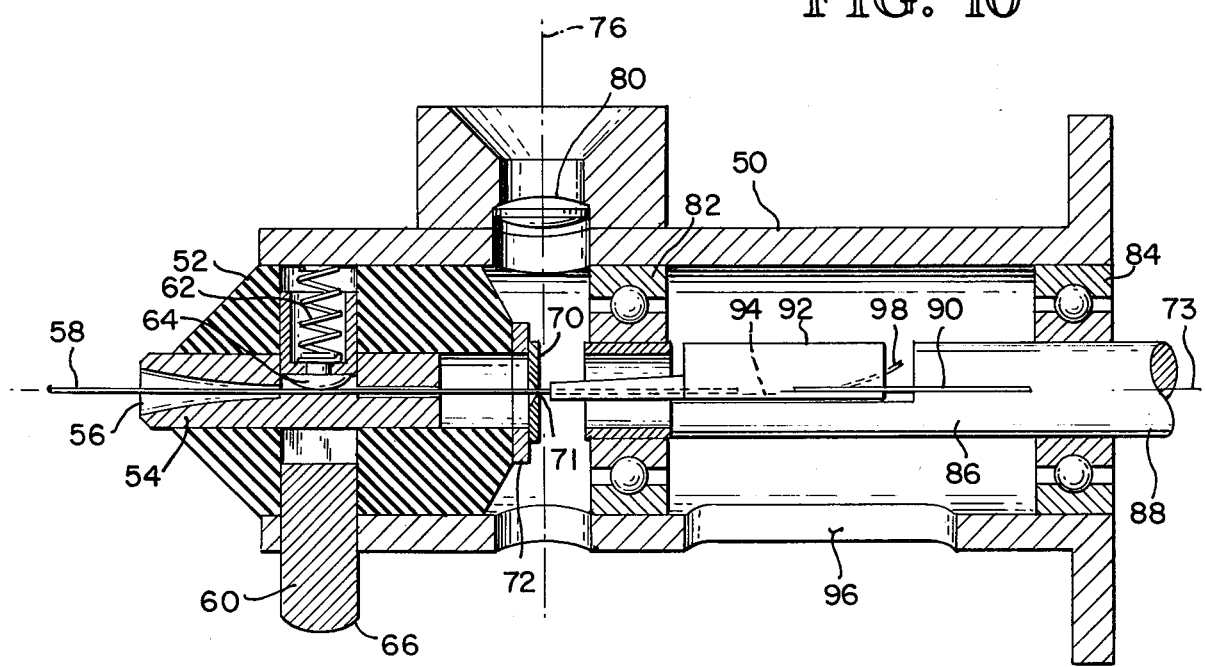
FIG. 10

METHOD AND APPARATUS FOR CUTTING OPTICAL FIBERS

BACKGROUND OF THE INVENTION

A. Field of the Invention

The present invention relates to a method and apparatus for cutting optical fibers, and more particularly, to a method and apparatus for successively scribing and breaking an optical fiber along a plane either oblique or perpendicular to its axis.

B. Description of the Prior Art

One of the major uses of fiber optics is long distance wide band communications. In this utilization, fiber optics surpasses coaxial cable in every respect; it offers wider band widths over greater distances without repeaters, uses no scarce or expensive materials, and has complete freedom from both cross-talk between parallel lines and electromagnetic interference. Eventually, it is expected that the installed cost of systems using fiber optic data transmission will be lower than for any form of wire data transmission.

Particularly in long distance wide band data transmission, single optical fibers are being used almost exclusively in preference to bundles of fibers. The single fiber transmission path consists of a single fiber of glass or fused silica, usually between 16 and 100 microns in diameter. When two such fibers interface with transmitting or receiving devices or are joined in a splice or with connectors, the end surfaces must be finished optically smooth and perpendicular to the fiber axis in order to achieve low coupling loss. Fiber optic cable is normally supplied by its manufacturers in the form of spooled stock, much the same as wire and the installation of connectors and the making of splices is left to the user. Frequently, this work must be done under highly adverse conditions such as in manholes where the procedures must be kept simple and the results must be of good quality and repeatable.

Single fibers are usually cut by the "scribe-and-break" technique. In general, this technique is performed by nicking or scribing the fiber at one point on its circumference with a diamond or tungsten carbide knife edge. Thereafter, sufficient tension is applied to cuase a fracture. This is very similar to the age-old technique used for cutting glass rod and tubing for laboratory applications. Although it sounds simple, the actual mechanization of this technique to produce satisfactory results requires extremely uniform fibers and very exact control of the scribe depth, applied tension, and bend radius, if any. Control of these parameters is sufficiently difficult that, even under laboratory conditions, it is frequently necessary to repeat the process several times in order to produce a surface of acceptable quality at the fracture. In general, the fracture simply propagates in an uncontrolled manner through the path of least resistance and an ideal perpendicular flat surface is seldom obtained.

Another disadvantage of the prior art "scribe-and-break" technique is that when an acceptable quality surface cut is obtained, the circumferential edge is very sharp. This sharp edge frequently causes chipping when an installation of the fiber into a connector is made. Frequently upon insertion of the fiber into the connector, the edge is fractured or the connector material is shaved and a miniscule chip lodges itself in between the fiber and connector causing a bad connection.

The herein disclosed invention has an inherent advantage which avoids the occurrence of a sharp edge; instead it produces a beveled or rounded corner between the outer surface of the fiber and the obtained surface of the perpendicular or oblique plane of the cut.

A similar method and/or apparatus performing high quality cutting of an optical fiber has not been observed in the prior art.

SUMMARY OF THE INVENTION

As mentioned above, it is essential that the fiber is fractured at a perfect plane either perpendicular or oblique to its axis so that a coupling with the least loss can be made. In most instances, a perpendicular fracture is required and the following description explains the preferred embodiment therefor.

Accordingly, a portion of the fiber to be cut is held between two holding members. The first holding member or fixture comprises a clamping device preferably coated with a resilient surface so that the fiber is not damaged yet firmly clamped.

The second holding or retaining member is also provided with a soft material which retains the free end of the fiber portion but does not clamp the fiber material. The retaining member is connected to a motor. This connection is flexible and in alignment coaxially with the fiber portion. The retaining member may be provided with an offset mass so that upon activation of the motor the retaining member rotates, and, as speed increases, it will orbit because of the effect of the developed centrifugal force. Accordingly, the retaining member will orbit in a spiraling motion and the radius of the spiral will increase when the speed of the motor increases.

In between the clamping device and the retaining member, mounted perpendicularly to the axis of the fiber portion therein is a cutting knife having a circular cutting edge located at a predetermined radius from the fiber portion.

When the radius of the spiraling orbiting motion increases, the fiber will travel adjacent and successively in contact with the cutting edge so that a circumferential scribe is created around the fiber.

Once the fiber has come into contact with the cutting edge, further acceleration of the motor will result in a bending moment being exerted on the fiber by the retaining member with the cutting edge as the fulcrum. The bending moment will cause internal stress within the fiber, this stress being concentrated in the area of the scribe mark. As the motor still further accelerates, the stress will continue to rise until the fiber fractures. The resultant fracture will be along the scribe mark and the fractured surface will form a plane perpendicular to the axis of the fiber.

Production of an ideal fracture requires that the fiber become completely circumscribed prior to fracture. If the apparatus is motor-driven and the force applied to the fiber is centrifugal, it is desirable that the motor accelerate slowly enough to insure complete circumscription prior to the buildup of internal stress sufficient to cause fracture. Alternatively, the motor may be provided with a speed control which permits circumscription at a relatively low speed and fracture at a relatively higher speed. Still another alternative would be to use a relatively constant-speed motor in conjunction with a variable axial spacing between the cutting knife and the retaining member. The fiber would then be circumscribed with a small spacing which would cause only a small bending moment, and fracture would be accomplished by increasing the spacing and thereby increasing the bending moment.

The motor acceleration may be controlled electrically, electronically, or simply by providing the rotating members with sufficiently high mass such that the acceleration is limited by rotational inertia.

It is also obvious that the fiber could be circumscribed in the manner described and that fracture could be accomplished subsequently by applying a tensile force, a bending moment, a mechanical shock or a thermal shock. The resultant plane perpendicular surface will show a slightly rounded corner or radius at its outer edge. This inherently produced radius or rounded corner is preferred because a sharp circular edge may cause unwanted subsequent fractures to occur at the edge.

The above described operation is provided by an apparatus having the size of a hand-held flashlight, and the complete cutting operation takes not longer than 5 to 10 seconds. A preferred embodiment of the apparatus is described hereinafter.

It is therefore an object of the present invention to provide a cutting method for optical fibers wherein the fiber is circumferentially scribed perpendicularly to the axis of the fiber and thereafter broken to produce a plane surface perpendicular to the axis of the fiber.

It is another object of the present invention to provide an apparatus for holding an optical fiber and scribing the same circumferentially and subsequently breaking the fiber at the scribe to create a plane surface shaped end portion to the fiber.

It is furthermore an object of the present invention to provide a portable apparatus for automatically cutting optical fibers at an angle perpendicular to their axis within a few seconds.

Other objects and advantages will be in part apparent and in part pointed out specifically hereinafter in connection with the description of the attached drawings.

BRIEF DESCRIPTION OF THE DRAWINGS

FIG. 8 is a schematic view of the apparatus which teaches the principle of operation of the perpendicular cutting method of the present invention.

FIG. 9 is an exaggerated view of the fiber angle at the circumferential bending step.

FIG. 10 is a cross section of a portion of the preferred embodiment of the manufactured apparatus.

DETAILED DESCRIPTION OF THE INVENTION

Figure 1:
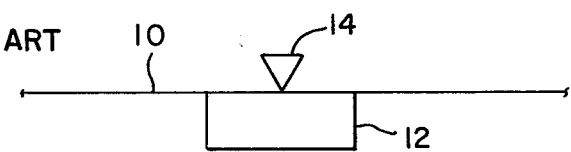
FIG. 1 is a schematic view of a fiber cutting operation as performed in the prior art.
Figure 2:
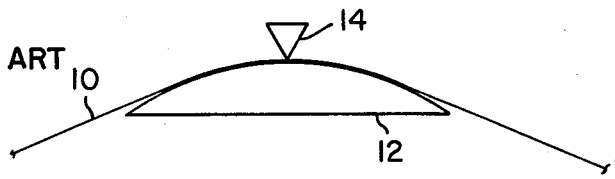
FIG. 2 is a schematic view of a fiber cutting operation as performed in the prior art.

The first six drawings attached to this specification illustrate the shortcomings of the prior art which were discussed above. FIG. 1 and FIG. 2 show the two variations which are practiced. As illustrated, the fiber 10 is nicked or scribed with a diamond or tungsten carbide knife 14 while supported on an anvil 12 after which sufficient tension is applied to cause the fracture. These techniques seem simple; however, the fiber material, the non-circular nick or scribe and the tension all must be controlled very accurately. Many faulty cuts are produced by this operation. In practice, a fiber is cut over and over again unitl an acceptable cut happens because scribe depth, bend radius, tension, fiber material etc., are all parameters which are difficult to control accurately.

It will be understood by those skilled in the optical fiber communication field that the non-ideal cuts produce losses and disturbances to the transmitted signal and that, furthermore, the present disclosed method and apparatus is a revolution in the optical fiber field offering a significant improvement.

Figure 3:
FIG. 3 is a non-ideal cut.
Figure 4:
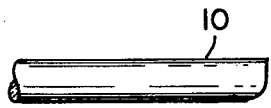
FIG. 4 is a non-ideal cut.
Figure 5:
FIG. 5 is a non-ideal cut.
Figure 6:
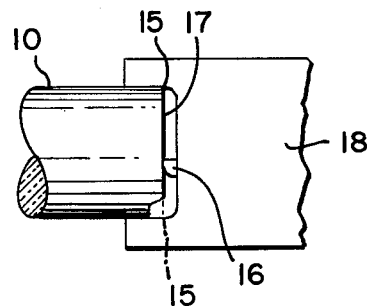
FIG. 6 is a non-ideal cut and non-ideal coupling.

FIGS. 3, 4, and 5 show the typical deviations which commonly occur to the fiber by the use of the prior art cutting methods. These deviations occur because after scribing or nicking, the fracture simply propagates in an uncontrolled manner through the path of least resistance. A typical faulty connection is shown in FIG. 6. Here, the cut appeared perpendicular to the axis of the fiber during coupling, but as the coupling was made, because of the sharp corner 15, a chip 16 broke off and lodged between the cut surface 17 and the connector 18. This produced a faulty connection and repair is essential. Also, but not illustrated herein, the sharp corner of the cut fiber may cause gouging of metal chips from the material of the connector during insertion of the fiber, and these chips cause the same problems as do chips that break off the fiber.

Accordingly, it will be understood that a slight radius at the corner at the edge of the edge of the cut or break is preferable so that the formation of both kinds of chips can be avoided.

Referring now to the schematic view of the operation of the invention as illustrated in FIG. 8: There is a fiber end portion 20 clamped by a force 24 between two clamping members 22 and 23 which preferably have resilient inside surfaces. The force 24 is sufficient to hold the fiber 20 firmly in place without crushing or damaging the fiber material. The fiber 20 then passes through an an optical loosely-fitting tube 25, the purpose of which is to provide substantial axial alignment of the fiber 20 with a cutting die 26.

The end of the tube 25 nearest the clamping members 22 and 23 is preferably tapered to a larger diameter to permit easy insertion of the fiber 20. The cutting die 26 contains a truncated conical or bioconical hole, the minor circumference of which forms a circular cutting edge 27 of slightly larger diameter than the fiber diameter.

Cutting die 26 is preferably manufactured from industrial diamond, tungsten carbide, or other material substantially harder than the fiber 20. A rotor assembly 28 rotates about an axis 29 which is coincident with the axis of the fiber 20. Attached to the rotor 28 is a radially elastically-constrained member 30 which contains a smooth non-cutting hole 31 which is also concentric with the axis of the fiber 20.

Figure 7:
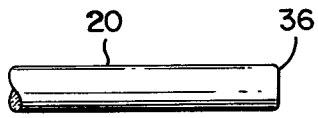
FIG. 7 is an ideal cut produced by the method of the present invention.

In operation, the elements 22, 23, 25, and 26 remain stationary with the relationships as shown and the elements 28 and 30 rotate about the axis 29. With the fiber 20 clamped in place as shown, elements 28 and 30 are caused to rotate with a continually increasing angular velocity either manually or for example, by an electric motor 33. As angular acceleration occurs, a centrifugal force 32 acting on member 30 increases in proportion to the angular velocity. Being elastically constrained, member 30 deflects radially by an amount which is a function of the magnitude of the centrifugal force and hence also is a function of the angular velocity. As member 30 deflects radially, hole 31 comes in contact with fiber 20 causing it also to deflect radially and travel in an orbiting path but without rotation of the fiber 20. At some angular velocity, the fiber 20 is deflected sufficiently to come into contact with the cutting edge 27 and fiber 20 becomes completely circumscribed. As illustrated in FIG. 9 in an exaggerated form, further increase of angular velocity causes the fiber 20 to bend over the cutting edge 27 at the scribe or line 40. The resultant bending movement rotates as the member 30 rotates causing alternating compressive and tensile stresses of increasing magnitude to be applied precisely across and progressively around the line 40 where circumscribed. At some angular velocity, fracture of the fiber 20 occurs and this fracture propagates around the line 40 where the fiber is circumscribed. Once fractured, the free end of the fiber 20 becomes completely detached by centrifugal force from the clamped part of the fiber 20. The clamped portion 34 then returns to its quiescent position concentric with the circular cutting edge 27. The result of this sequence of events is a fracture which is planar and perpendicular to the axis of the fiber. As a bonus, half of the scribe around the fiber 20 remains with the fiber and forms a slight radius or rounded bevel 36 shown in FIG. 7. This bevel 36 eliminates the sharp edges which normally interfere with insertion of the fiber into connectors or splice blocks.

The apparatus schematically illustrated in FIG. 8 can be designed into an instrument or apparatus of hand-size compactness. Since negligible power is required to perform the above operation, an apparatus containing all of the elements of FIG. 8 plus a battery and electric motor can fit easily into a shirt pocket.

Figure 11:
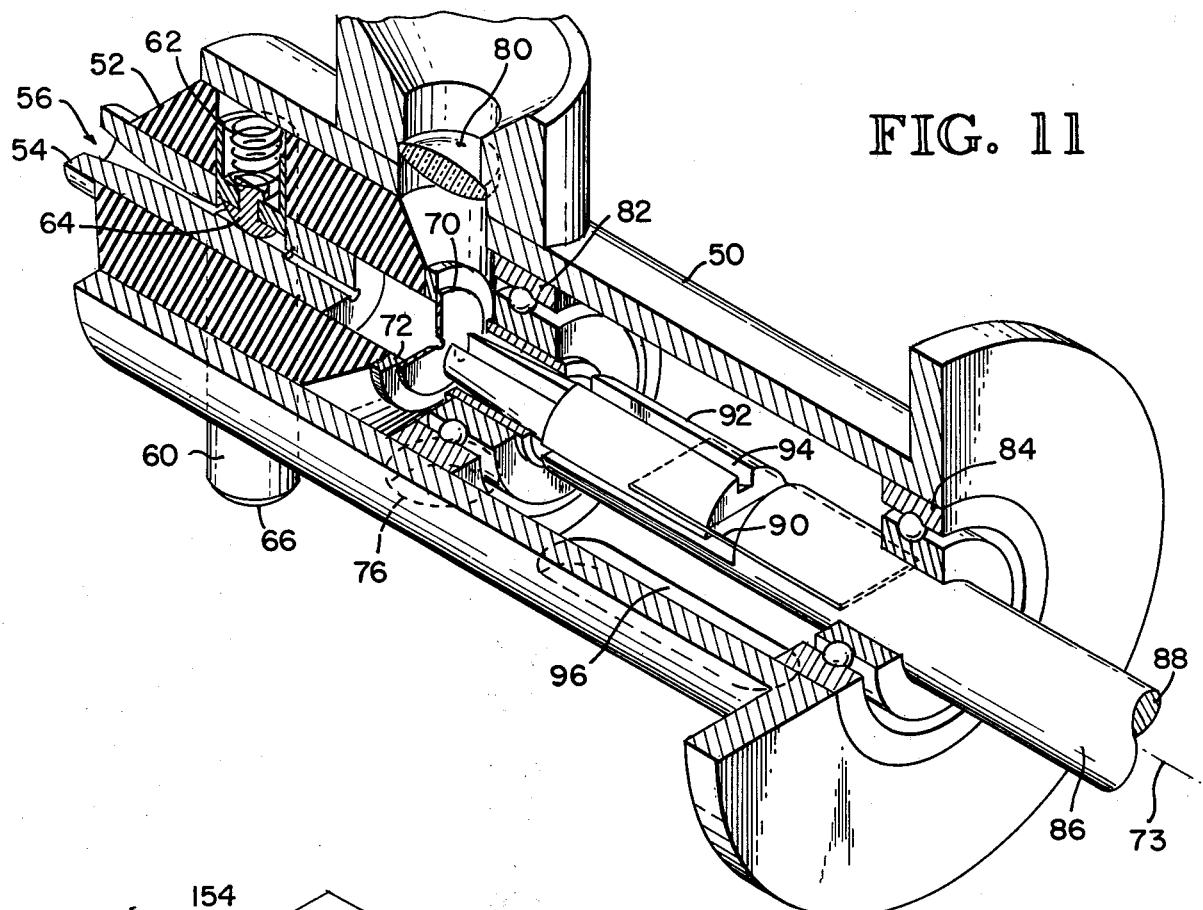
FIG. 11 is an isometric view of the figure illustrated in FIG. 10.

FIG. 10 and FIG. 11 illustrate a portion of an actually built apparatus having a supporting cylinder or base 50. A closure member 52 is mounted at the entrance of the cylinder 50 and carries a fiber insert member 54 having an opening 56 which extends coaxially to the axis 73 of the cylinder 50. The opening is funnel shaped at the entrance to enhance the insertion of fiber 58. A clamping member 60 provided with a spring 62 and resilient clamping block 64 is operationally arranged and mounted perpendicularly to the cylinder axis inside of the closure member 52. The spring 62 causes the block 64 to close the opening 56. Upon a slight finger pressure on the pushbutton portion 66, the opening 56 will be unblocked and the fiber 58 can be inserted and subsequently clamped firmly when the finger pressure is released.

The closure member 52 is further provided with a thereon mounted cutting die 70 having an internal circular cutting edge 71, and a washer 72. The washer 72 may have a tapered (sectional) thickness (not illustrated) so that the edge 71 would be positioned at an oblique angle to the cylinder axis 73. Thus, the washer 72 represents a crude form of varying the mounting of the cutting die 70. In the most preferred embodiment and practical operations, the cutting die 70 is mounted perpendicular to the cylinder axis, as illustrated. Mounted at the side of cylinder 50 and in correspondence to bore 76 through the cylinder axis is an adjustable magnifying eye sight member with lens 80 for observing the fiber cutting operation and in particular to observe the obtained cutting result. Cylindrical bearing means 82 and 84 are mounted inside of the cylinder 50 for support of a rotor means or axle 86 which is driven manually or by a motor (not shown) at the rotor end or axle portion 88.

A flexible member or spring blade 90 is mounted on the rotor means 86 and carries a fiber retaining member 92.

The fiber retaining member 92 is provided with a slot or an opening 94 which travels coaxially to the cylinder axis 73 for retaining the end portion 98 of the fiber 58 after it is passed through the center of the circular cutting edge 71 of the cutting die 70. The opening 96 serves for removal or shaking out of the left over portion 90 of the fiber when the cutting step is completed.

Assuming that a fiber has to be cut at a perpendicular plane to the fiber axis, one inserts the fiber into the conical or funnel shaped entrance 56 of the insert 54 while simultaneously pushing button 66 which will move the resilient clamping block 64. As illustrated, clamping means 64 clamps the fiber by the force of the spring 62 at a first clamping location while the slot 94 retains the fiber at a third location. Upon rotation of the rotor means 86, the fiber retaining means 92 will experience a centrifugal force which will increase upon acceleration.

As described hereinbefore, the retained fiber moves along the spiraling path, becomes scribed circumferentially at a second location, and is cut at this location in a plane perpendicular to the axis of the fiber.

Figure 12:
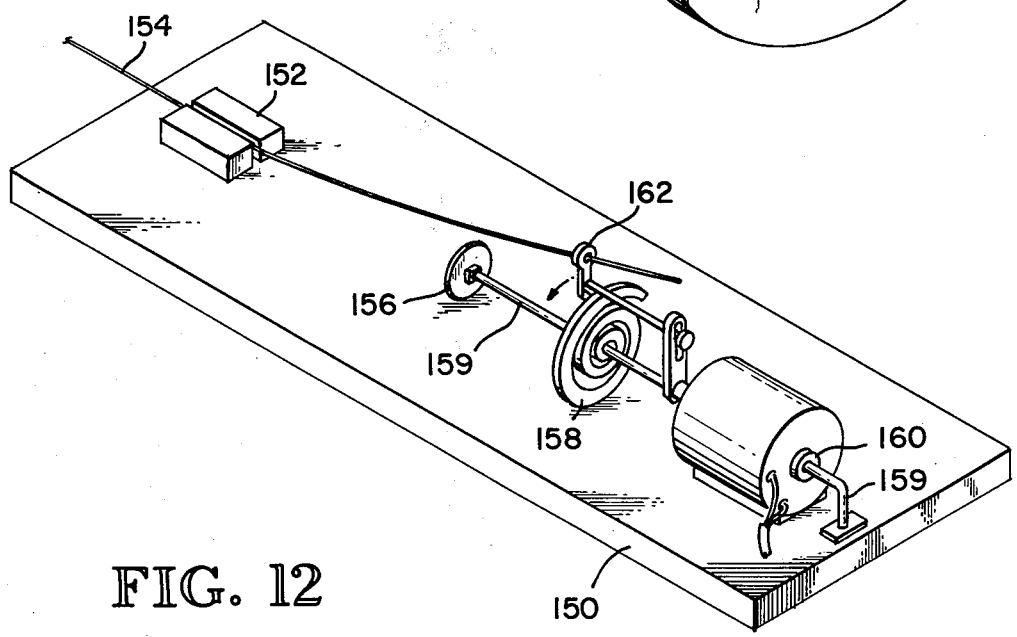
FIG. 12 is another schematic configuration of an apparatus for cutting an optical fiber.

FIG. 12 illustrates a base 150 and a thereon mounted clamping means 152 clamping a fiber 154. A cutting knife 156 mounted to a spiral shaped guiding mechanism 158 which for purpose of illustration is mounted to a non-rotating member 159 extending through the driven hollow axle 160. A fiber retaining means 162 moves the fiber 154 along a spiraling path having a continuously decreasing radius. During the spiraling movement, the fiber will contact at a certain position of the retaining means 162 the cutting knife 156 and successively become circumferentially scribed, bent, and fractured. The cut will be in a plane perpendicular to the fiber axis, if the edge of the cutting knife 156 is in a plane perpendicular to the axis of the fiber held in the clamping means 152 and extending to the center of the cutting knife 156.

It should be realized that numerous other variations and modifications may be made, such as clamping the fiber at two locations and orbiting both clamped locations coaxially about a therein between located cutting means.

Also it may be possible to design a device where the knife rotates about the fiber, etc.

Of course, it should be understood that instead of solid optical fibers, also hollow optical fibers or tubes could be cut, or any other fiber type used for other purposes by the herein disclosed method and apparatus.

Accordingly, it should be understood that the invention may be embodied in other forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

Now, therefore, I claim:

1. A method for cutting an optical fiber comprising the steps of:
   (a) clamping a fiber at a first location;
   (b) retaining the fiber at a third location spaced from the first location;
   (c) moving the fiber at the third location in a spiraling path;
   (d) scribing the fiber circumferentially at a second location substantially positioned in between the first and third location by continuing the spiraling movement; and
   (e) breaking the fiber by progressively bending and fracturing the fiber about the circumferentially applied scribe at the second location by continuing the spiral movement.

2. A method for cutting an optical fiber along a plane perpendicular to the fiber axis, comprising the steps of:
   (a) clamping a fiber at a first location;
   (b) retaining the fiber at a third location spaced from the first location;
   (c) moving the fiber at a third location in a spiraling path;
   (d) scribing the fiber circumferentially at a second location along a plane perpendicular to the fiber axis at the second location by continuing the spiraling movement; and
   (e) breaking the fiber by progressively bending and fracturing the fiber about the circumferentially applied scribe at the second location by continuing the spiraling movement.

3. Apparatus for cutting an optical fiber, comprising in combination:
   (a) a base;
   (b) a clamping means mounted on said base for clamping an associated fiber to be cut;
   (c) a restraining means for holding said fiber;
   (d) a rotor means mounted on said base and carrying said fiber restraining means, said rotor means adapted to move said restraining means in a spiraling path; and
   (e) a cutting means having a cutting edge substantially disposed between said fiber clamping means and said fiber restraining means adjacent said fiber whereby upon activation of said rotor means, said restraining means moves said fiber in a spiraling path for successively contacting, circumferentially scribing, and breaking said fiber at said cutting means.

4. An apparatus for cutting an optical fiber as claimed in claim 3 whereby said cutting edge is positioned to scribe said fiber circumferentially on a plane perpendicular to the axis of said fiber.

5. An apparatus for cutting an optical fiber as claimed in claim 3 whereby said cutting means is provided with an adjusting means for positioning said cutting edge to scribe said fiber circumferentially on a predetermined plane ranging from oblique to perpendicular in relation to the axis of said fiber.

* * * * *